United States Patent [19]

Wolter et al.

[11] Patent Number: 5,592,323
[45] Date of Patent: Jan. 7, 1997

[54] APPARATUS FOR TRANSMITTING DATA

[76] Inventors: Klaus Wolter; Dieter Henke, both of Friedrich-Wilhelm-Str. 32, 40625 Dusseldorf, Germany

[21] Appl. No.: 428,168

[22] PCT Filed: Oct. 28, 1993

[86] PCT No.: PCT/EP93/03009

§ 371 Date: Jun. 20, 1995

§ 102(e) Date: Jun. 20, 1995

[87] PCT Pub. No.: WO94/10594

PCT Pub. Date: May 11, 1994

[30] Foreign Application Priority Data

Oct. 30, 1992 [DE] Germany ............... 42 36 704.2

[51] Int. Cl.⁶ ............... H04B 10/04; H04B 10/12; H04B 10/00
[52] U.S. Cl. ............... 359/188; 359/173; 359/152; 359/151; 385/24
[58] Field of Search ............... 359/127, 151–152, 359/163, 173, 179, 188; 385/9, 15, 24, 25, 31, 32, 39; 250/227.11

[56] References Cited

U.S. PATENT DOCUMENTS

| 4,155,159 | 5/1979 | Hogan et al. ............... 29/764 |
| 4,678,264 | 7/1987 | Bowen et al. ............... 385/89 |
| 5,159,654 | 10/1992 | Salter ............... 385/59 |
| 5,432,630 | 7/1995 | Lebby et al. ............... 359/163 |
| 5,475,778 | 12/1995 | Webb ............... 385/15 |

FOREIGN PATENT DOCUMENTS

| 0428159 | 5/1991 | European Pat. Off. . |
| 512999 | 6/1991 | European Pat. Off. . |
| 56-198372 | 12/1981 | Japan . |
| 62-008626 | 1/1987 | Japan . |

Primary Examiner—Wellington Chin
Assistant Examiner—Kinfe-Michael Negash
Attorney, Agent, or Firm—Meltzer, Lippe, Goldstein, et al.

[57] ABSTRACT

A coupling apparatus for optical data transmission has a plug element which is form-fitted into an associated socket element. The plug element contains guide channels for aligning and securing a group of individual optical waveguides within a single oversheath, so that the waveguide ends are flush with the mating face of the plug element. The socket element contains matching guide channels which are flush with the socket face, for receiving the optical signals from the corresponding plug channels. The socket element also contains circuitry for the detection, amplification, and re-transmission of the received optical signals.

17 Claims, 3 Drawing Sheets

APPARATUS FOR TRANSMITTING DATA

BACKGROUND OF THE INVENTION

1. Field of the Invention

The invention relates to an apparatus for the transmission of data.

More particularly, the invention relates to a coupling device for the transmission of optical data.

2. Description of the Prior Art

Data transmission lines which are suitable for transmitting encoded light signals via optical waveguides consist, according to the state of the art as known from practice, of a central support element, on which the oversheaths for the individual optical waveguides are supported. The optical waveguides per se, which in most cases consist of optical fibres, are disposed individually in said oversheaths which are encompassed by a common foil braiding, a textile tape and a further common protective sheath made from caoutchouc material. Data transmission lines arranged in such a way are known as "hollow-cored conductors" in the field of the art as a result of the individual arrangement of each optical waveguide in a separate oversheath. The reason for the extensive protection of the individual fibres in such data transmission lines is due to the fact that the individual fibres are to be kept free from any mechanical stress through the protective sheath and that any penetration of the line by liquids is to be prevented.

In addition to data transmission lines arranged as hollow-cored conductors, lines with optical waveguides are known in which a plurality of individual fibres are disposed in a common oversheath as so-called "buffered fibres". Such buffered fibres are used, for example, in the fields of surgery or microcamera technique for transmitting light from a constantly burning light source at a place that is difficult to access.

A coupling element which is suitable for connecting data lines of the kind mentioned above is known from the German patent specification DE 31 13 168 C2. This coupling element concerns a cable connector which is arranged in such a way that the optical waveguides opening into it can be guided in a radius which prevents damaging them. The known cable connector is provided with recesses in which modularly arranged transducer circuits are insertable. The transducer circuits convert the light signals transmitted through the optical waveguides directly into electrical signals and are provided with connections over which the transducer circuits can be connected to a device for further processing the electrical signals supplied by them.

Finally, from the German patent specification DE 31 16 252 A1 an optoelectronic transducer is known which can be plugged into a line comprising an optical waveguide. This transducer is provided with an outer and inner sleeve which jointly ensure that the sensor of the transducer which is arranged in a disk-like manner is arranged in a centered manner with respect to the face side of the optical waveguide.

Apparatuses for transmitting encoded light signals which are equipped with the above-mentioned individual elements have shown to be particularly sturdy and hardly susceptible to faults in practice. Their common disadvantage, however, is that considerable efforts are required concerning their production, both with respect to the material as well as the technical requirements. As a consequence they are expensive and, in particular, the known hollow-cored conductors are not recyclable owing to the large number of the materials used in their production. The high costs in these known apparatuses have lead to the consequence that they are only used in very few high-quality applications. In contrast to this, in the field of rapid parallel data transmission, for example, where a plurality of individual lines is required, common copper cables are still used. The length of such copper cables, however, is limited. In the case of larger transmission lengths, however, the much slower serial data transmission is used in practice instead of the faster parallel data transmission, with optical fibres being used advantageously for larger transmission lengths.

It is an object of the present invention to provide an easy-to-manufacture, inexpensive apparatus of the kind mentioned above which enables a fast, fault-free transmission of encoded light signals.

SUMMARY

In accordance with one embodiment of the invention, the data transmission line comprises at least eight individual lines arranged as optical waveguides, which are particularly suitable for fast parallel data transmission because the individual bits of the data word are transmitted simultaneously via the optical waveguides which are allocated to these separately. Any influence of the data transmission by electromagnetic radiation is excluded. In addition, parallel data can be transmitted at high transmission speeds over long distances by means of the apparatus in accordance with the invention, as the transmission is made nearly loss-free.

The invention starts out from the finding that for the secure transmission of encoded light signals by means of optical waveguides it is not necessary to arrange each individual optical waveguide in a separate oversheath. Accordingly, the individual optical waveguides which are designated for the transmission of the light signals are placed in accordance with the invention unprotected in a common oversheath in the manner of buffered fibres. In contrast to the state of the art, each optical waveguide is used for transmitting one separate light signal. In this respect the danger of mechanical damage to the optical waveguide is reduced in such a way that the ends of the optical waveguide are guided in the coupling elements. An extensive protection of each individual optical waveguide can be omitted, so that the data transmission line in accordance with the invention can be manufactured with a substantially lower employment of materials than the known lines. By additionally arranging the face sides of the optical waveguides in the ultimate vicinity of the face sides of the coupling elements it is possible to connect the data transmission line directly to respectively arranged coupling elements without requiring any complex arrangement of transducer circuits or other coupling measures in the coupling element.

Further preferable embodiments of the invention shall be explained hereinafter.

The arrangement of the openings of the couplings should be made in a grid-like manner in order to simplify their usability in connection with existing industrial standards or to create a new industrial standard. A displaced arrangement of the openings enable the housing of a plurality of openings over a strictly limited area. The shape of the coupling elements can be simplified when the openings per se form the guiding means of the optical waveguide ends. The connection of the optical waveguides with the coupling elements can be facilitated in such a way that the feed-through openings are provided with funnel-like expansions through which the conductors are centered during their insertion into the openings. The funnel-like expansion is used in addition to increase the volume for the attachment, e.g. by means of adhesives such as bonding agents or heat seals. In this respect it is particularly preferable when the face sides of the conductors are in flush alignment with the face surface of the coupling elements, i.e., they lie in the plane of the face sides.

In order to simplify the recycling of the data transmission apparatus in accordance with the invention it is proposed that the coupling elements, the optical waveguides and the common sheath of the optical waveguides are made from related plastics.

A particularly sturdy arrangement of the coupling elements is achieved with a cuboid configuration of the mating surfaces. For the purpose of further simplification of its production the casing of the coupling elements should consist of two symmetrical parts.

A device which is particularly suitable for receiving the light signals transmitted by the apparatus in accordance with the invention includes a photodiode sensor, a digital signal transducer, and an amplifier. The circuits used in this device are characterized by high current sensitivity, a static signal amplification and low power dissipation. The device in accordance with the invention allows any desired output signal level, with the rise time and the signal propagation delay being dependent only on the quality of the light-sensitive sensor. Like the devices for receiving the signals, the apparatus for transmitting light signals includes opto-transmitter and driver circuits which are characterized by exceptional simplicity, whereby a variation of the transmitted light output is possible in this circuit by simple means.

For the reasons mentioned above the apparatus in accordance with the invention is particularly suited for the transmission of parallel data. Depending on the number of the individual fibres it is possible to transmit serially encoded information in addition to a parallel transmission. The parallel data transmission can be made according to the Centronics or the IEEE 488 standard. It is also possible that the apparatus in accordance with the invention is part of a bus transceiver.

The invention is now explained in closer detail by reference to the following drawings:

DESCRIPTION OF THE PREFERRED EMBODIMENT(S)

Figure 2:
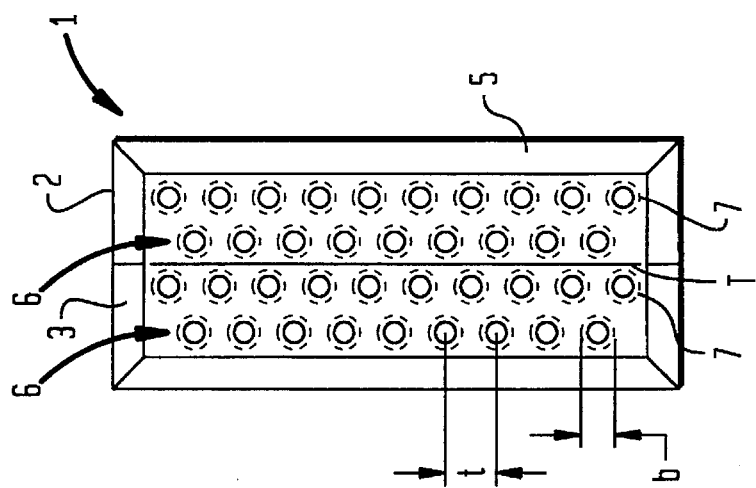
FIG. 2 shows a front view of the coupling element in accordance with FIG. 1.
Figure 1:
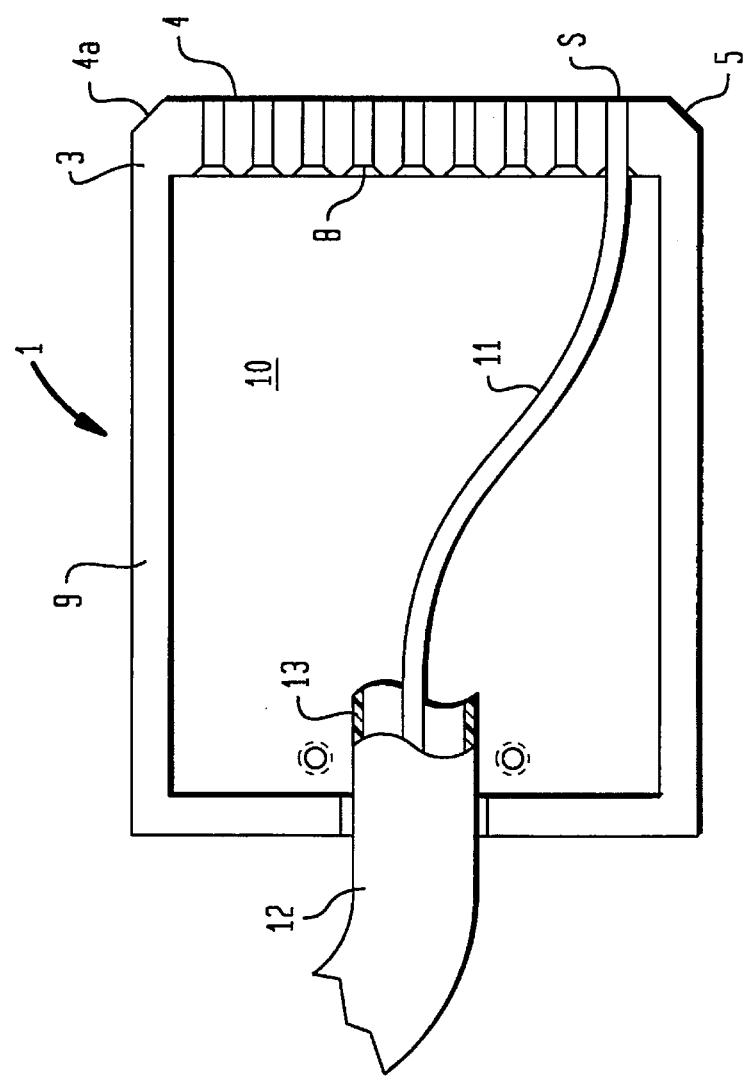
FIG. 1 shows in a top view the one part of a first coupling element arranged as a plug which is part of the apparatus in accordance with the invention for the transmission of data.

The coupling element 1 which is arranged as a plug connector and shown in FIGS. 1 and 2 is divided into two symmetrical parts 2, 3, with the plane of osculation T being aligned vertical to the face side 4 of the coupling element 1. The parts 2, 3 are detachably connected with one another by means of snap-on mountings or screwed connections (not shown). The coupling element 1 is provided in its entirety with a cuboid shape. Feed-through openings 5 are moulded into its face side 4, whose edge zone 4a is bevelled in a receding manner with respect to face side 4.

The feed-through openings 5 are arranged in a constant grid r at a distance from one another in parallel rows 6, 7, with rows 6 being offset from rows 7 by the width b of a feed-through opening 5. They are provided in the section averted from the face side 4 with funnel-like expansions 8 which open into the chamber 10 which is enclosed by the side walls 9 of the parts 2, 3.

Each of the feed-through openings 5 is used as guiding means for the end of one optical waveguide 11 each, which is inserted into the feed-through opening 5 associated with it in such a way that its face side S is flush with the face side 4 of the coupling element 1. The optical waveguides 11 are part of a data transmission line 12. One each of the coupling elements 1 is attached to their ends. The optical waveguides 11 are disposed without any special protection in a common oversheath 13 of the data transmission line 12.

Figure 3:
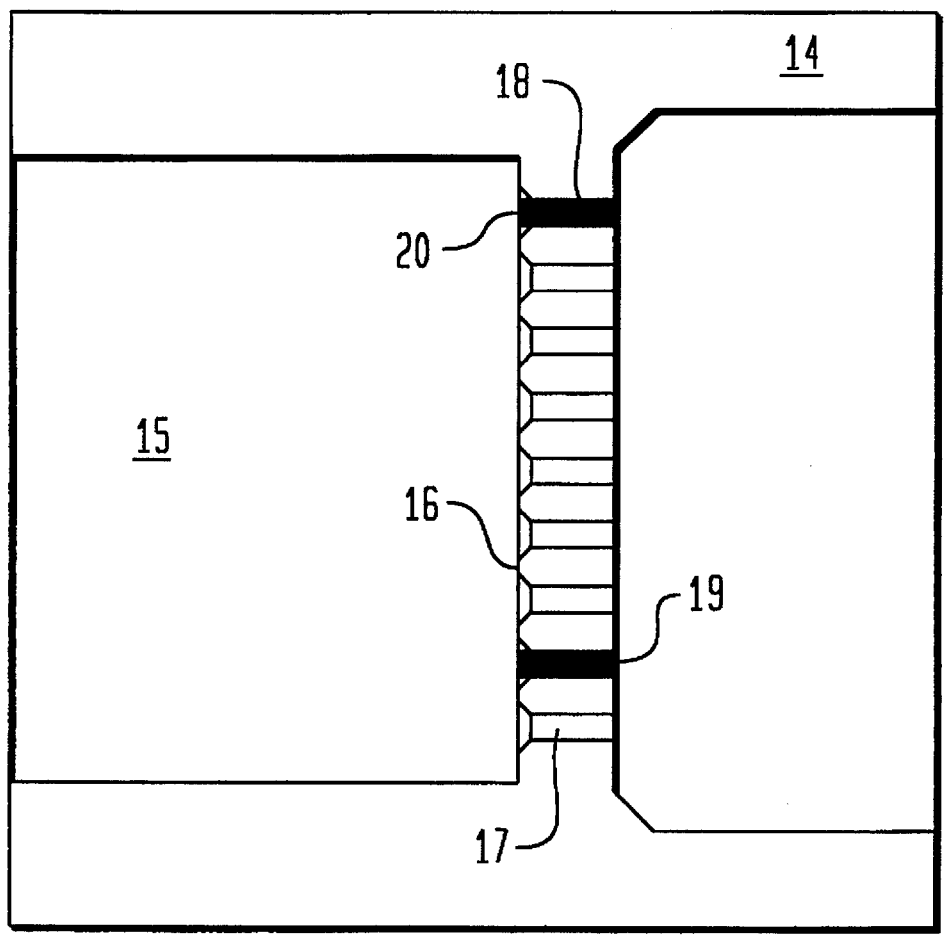
FIG. 3 shows a sectional top view of a second coupling element arranged as a socket, also in accordance with the present invention.

FIG. 3 shows a second coupling element 14 arranged as a socket which is made in one piece and is used as connection of a device for receiving and transmitting encoded light signals which is not shown separately. The coupling element 14 is provided with a first recess 15 whose shape corresponds to the shape of the coupling element 1, so that it can be inserted into the recess 15 in a form-fitting manner. Feed-through openings 17 are moulded into the base wall 16 of recess 15. Both the shape of the feed-through openings 17 as well as their arrangement correspond to the shape and the arrangement of the feed-through openings 5 of the first coupling element 1, so that the optical waveguide ends S are in flush contact with the feed-through openings 17 disposed in the face side 20. A light-sensitive sensor 18 may be seated in predetermined feed-through openings 17, whereas opto-transmitters 19 such as light emitting diodes are inserted in other feed-through openings 17. The face sides 20 of sensors 18 and light transmitters 19 are in flush alignment with the side 20 of the base wall 16 which is allocated to the recess 15. The sensors 18 are connected via lines 21 with the circuit shown in FIG. 4 for receiving the encoded light signals transmitted by the respective optical waveguides 11, whereas the opto-transmitters 19 are each connected via line 22 to a circuit (not shown) for transmitting the encoded light signals which operates according to the usual transmitting methods.

In accordance with a modification which is not shown in the drawing, the feed-through openings 17 may comprise further optical waveguides of a further data transmission line, which enables a simple coupling of the two lines which is not susceptible to faults.

The circuit for transmitting the light signals may comprise in addition to the opto-transmitter 19 a driver circuit for said emitter 19 which is connectable to an output unit for binary signals. Said output unit may concern a Centronics interface, for example. A connection to an interface which issues parallel signals according to the IEEE 488 standard is also easily possible. The IEEE 488 interface is also known as GPIB interface (GPIB=General Purpose Interface Bus).

Figure 4:
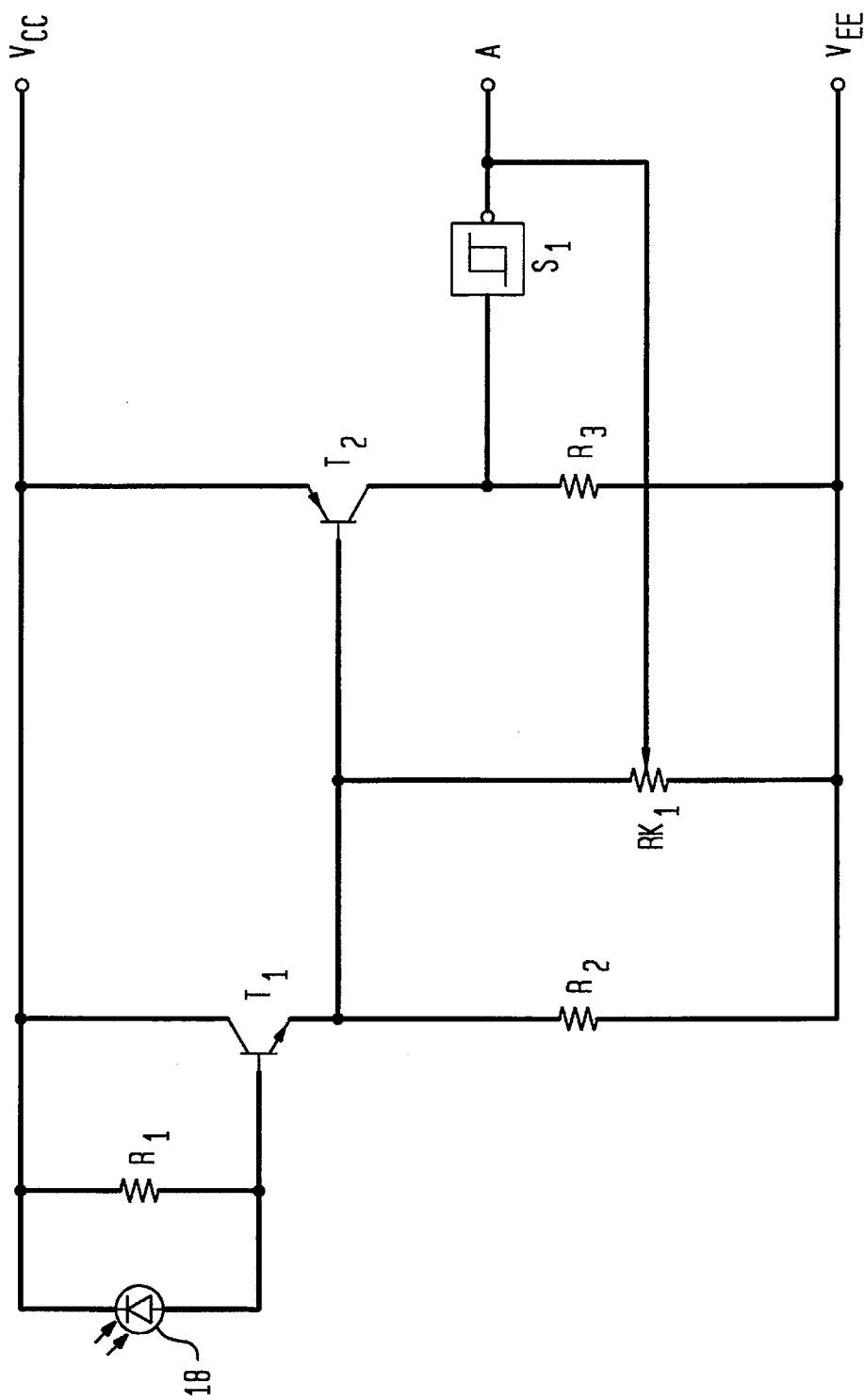
FIG. 4 shows a circuit diagram of a device for receiving encoded light signals.

The circuit shown in FIG. 4 for receiving the light signals comprises in addition to the said sensor 18 arranged as photodiode a resistor R1 switched parallel thereto and a transistor T1 connected with its base to said resistor R1 and the sensor 18. A transistor T2, a resistor R2 and a connection of a feedback unit RK1 are connected to the emitter of the transistor T1. An inverting threshold module S1 as well as a resistor R3 are connected to the collector of transistor T2. The output of the threshold module S1 is connected to the input of the feedback unit RK1.

The current gain is made in a simple way in the circuit for receiving the light signals by the bipolar transistor T1 switched as emitter follower whose output current on resistor R2 causes a voltage drop. Transistor T2 amplifies this voltage drop, so that an inverted voltage signal which is increased in its amplitude is applied to resistor R3.

It is inverted again by the threshold module S1 and limited to a standardized voltage level (e.g. according to the TTL standard).

The compensation of deviations in the voltage gain caused by temperature fluctuations is made in such a way that the current-amplifying transistor T1 and the voltage-amplifying transistor T2 are combined, whereby the transistor T2 is complementary to transistor T1 and shows a similar temperature behaviour. As a consequence of this, the influences of the drift in the amplifications by transistors T1, T2 which are caused by a change in temperature cancel each other out. The working range of T2 can be set via the voltage drop on R1 and T1 in such a way that without an input signal from sensor 18 the transistor carries just about so much current that a LOW level is securely present at output A of the circuit.

The behaviour of the circuit described above for receiving light signals can be reversed easily in a such a way that the sensor is not switched parallel to the resistor R1, but in the non-conducting direction between the base of transistor T1 and the voltage $V_{ss}$. When using photodiodes, the edges of the amplified signals are made steeper in this operating mode because a cut-off voltage is now applied to sensor 18.

The circuit in accordance with FIG. 4 is provided with a feedback via elements S1, RK1. This feedback causes the approach of the input level of S1 to its respective switching threshold by changing the operating point of transistor T2. In this way a direct imaging of the input signal on the receiver is achieved on output A.

We claim:

1. An apparatus for transmitting multi-bit data words by means of optical waveguides comprising:

a data transmission line having optical waveguides, a first coupling element connected to said data transmission line, said first coupling element receiving said optical waveguides to form a first group of optical waveguides, a second coupling element which can be detachably coupled with said first coupling element, said second coupling element having opto-transmitters, light-sensitive sensors, and a second group of optical waveguides, wherein said first and second coupling elements are each provided with feed-through openings which are mutually flush in the coupled condition, and in which the end surfaces of said first group of optical waveguides are associated with the end surfaces of said opto-transmitters, said light-sensitive sensors, and said second group of optical waveguides, wherein said first and second coupling elements are each provided with feed-through openings corresponding to at least the number of bits of said multi-bit data words when transmitted in parallel, and wherein said optical waveguides of said data transmission line are arranged as an optical waveguide bundle within a common oversheath, wherein said light-sensitive sensors are arranged in a partial number of said feed-through openings of said second coupling element, said light-sensitive sensors being connected to a circuit which comprises a complementary pair of transistors with compensating temperature characteristics, said transistors functioning as an emitter follower and a voltage amplifier, respectively, wherein said opto-transmitters are arranged in a further partial number of said feed-through openings of said second coupling element, and wherein said second group of optical waveguide sensors are arranged in a further partial number of said feed-through openings of said second coupling element.

2. The apparatus of claim 1, wherein said feed-through openings of said first and second coupling elements are arranged in an even grid pattern mutually distanced from one another.

3. The apparatus of claim 1, wherein said feed-through openings of said first and second coupling elements are arranged in rows which are mutually offset.

4. The apparatus of claim 1, wherein said feed-through openings of said first and second coupling elements are arranged in a duct-like manner, so as to form guiding segments for the ends of said first and second groups of optical waveguides, and for the ends of said light-sensitive sensors and said opto-transmitters.

5. The apparatus of claim 1, wherein each of said feed-through openings of said first and second coupling elements is expanded in a funnel-like manner in its zone associated with the interior of each of said first and second coupling elements.

6. The apparatus of claim 1, wherein said first and second coupling elements, said first and second groups of optical waveguides, and said oversheath of said data transmission line encompassing said optical waveguide bundle are made from jointly recyclable plastics.

7. The apparatus of claim 1, wherein the face sides of said first group of optical waveguides in said first coupling element, and the face sides of said light-sensitive sensors, said opto-transmitters, and said second group of optical waveguides in said second coupling element, are aligned in parallel with the corresponding surfaces of the face sides of said first and second coupling elements.

8. The apparatus of claim 1, wherein said first coupling element is arranged as a plug connector and is provided with a cuboid segment on whose free end said face side of said first coupling element is arranged, and wherein said second coupling element is provided with a respective cuboid recess into which said cuboid segment of said first coupling element is insertable in a form-fitting way, and wherein said second coupling element further comprises a base wall, in which said feed-through openings are formed to accommodate said light-sensitive sensors, said opto-transmitters, and said second group of optical waveguides.

9. The apparatus of claim 1, wherein said cuboid segment of said first coupling element is provided with a bevel edge receding from said surface of said face side of said first coupling element.

10. The apparatus of claim 1, wherein said first coupling element is formed from two symmetrically arranged parts.

11. The apparatus of claim 1, wherein said light-sensitive sensor comprises a photodiode for converting light signals into electrical signals, said light-sensitive sensor being connected to a signal transducer circuit for converting said electrical signals into digital voltage levels.

12. The apparatus of claim 1, wherein said signal transducer circuit is further provided with an amplification circuit for amplifying said digital voltage levels to a predeterminable voltage level.

13. The apparatus of claim 1, wherein said opto-transmitter is connected to a driver circuit which amplifies a voltage signal supplied by an encoder device to a level required for the operation of said opto-transmitter.

14. The apparatus of claim 1, wherein serially encoded data are transmitted in addition to said parallel data transmission.

15. The apparatus of claim 1, wherein said parallel data transmission is made according to the Centronics standard protocol.

16. The apparatus of claim 1, wherein said parallel data transmission is made according to the IEEE 488 standard protocol.

17. The apparatus of claim 1, wherein said first group of optical waveguides form part of a transceiver of a parallel bit bus wherein the number of channels of said transceiver is determined by the number of optical waveguides in said first group.

* * * * *